United States Patent
Riegger et al.

(10) Patent No.: US 11,124,175 B2
(45) Date of Patent: Sep. 21, 2021

(54) CONTROL METHOD FOR A VEHICLE HYBRID DRIVETRAIN

(71) Applicant: ZF Friedrichshafen AG, Friedrichshafen (DE)

(72) Inventors: Moritz Riegger, Meckenbeuren (DE); Michael Sauter, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 9 days.

(21) Appl. No.: 16/815,046

(22) Filed: Mar. 11, 2020

(65) Prior Publication Data
US 2020/0290595 A1   Sep. 17, 2020

(30) Foreign Application Priority Data
Mar. 11, 2019   (DE) ...................... 10 2019 203 225.7

(51) Int. Cl.
*B60W 20/40*   (2016.01)
*B60W 10/02*   (2006.01)
(Continued)

(52) U.S. Cl.
CPC ............ *B60W 20/40* (2013.01); *B60W 10/02* (2013.01); *B60W 10/06* (2013.01); *B60W 50/10* (2013.01);
(Continued)

(58) Field of Classification Search
CPC ...... B60W 10/02; B60W 10/06; B60W 10/08; B60W 10/11; B60W 20/30; B60W 20/40;
(Continued)

(56) References Cited

U.S. PATENT DOCUMENTS 9,227,629 B2   1/2016  Zollner et al.
9,541,180 B2 *  1/2017  Kaltenbach ............. F16H 3/089
(Continued)

FOREIGN PATENT DOCUMENTS

DE   10 2010 036 132 A1   3/2012
DE   10 2011 078 670 A1   1/2013
(Continued)

OTHER PUBLICATIONS

German Search Report Corresponding to 10 2019 203 225.7 dated Jan. 30, 2020.

*Primary Examiner* — Edwin A Young
(74) *Attorney, Agent, or Firm* — Finch and Maloney, PLLC; Michael J. Bujold; Jay Franklin

(57) ABSTRACT

A method for operating a hybrid drive train of a motor vehicle (X) which has a combustion engine (VM), a transmission (G), an electric machine (EM), as well as a separation clutch (KO) positioned between the combustion engine (VM) and the electric machine (EM). During a purely electric drive operation in which the separation clutch (KO) is disengaged and, when a gear is selected in the transmission (G), and during expectation, reaching, or exceeding a rotational speed difference of the separation clutch (KO) is larger or equal to a limit value, and/or in an expectation, reaching, or exceeding a rotational speed limit of the electric machine (EM), the separation clutch (KO) is engaged.

(Continued)

Further, an electronic control unit (ECU) executes the method and a motor vehicle (X) having such an electronic control unit (ECU).

13 Claims, 3 Drawing Sheets

(51) Int. Cl.
    *B60W 10/06*     (2006.01)
    *B60W 50/10*     (2012.01)

(52) U.S. Cl.
    CPC ............... *B60W 2300/125* (2013.01); *B60W 2510/0283* (2013.01); *B60W 2510/081* (2013.01); *B60W 2520/105* (2013.01); *B60W 2710/021* (2013.01)

(58) Field of Classification Search
    CPC .... B60W 30/19; B60W 30/192; B60W 30/23; B60W 30/125; B60W 2510/081; B60W 2510/082; B60W 2510/0241; B60W 2510/025; B60W 2510/1005; B60W 2510/0283; B60W 2710/021; B60W 50/10; B60W 2520/105
    See application file for complete search history.

(56) References Cited

U.S. PATENT DOCUMENTS

| | | | |
|---|---|---|---|
| 2008/0059032 A1* | 3/2008 | Hofmann | B60K 6/48 701/55 |
| 2010/0204005 A1* | 8/2010 | Kaltenbach | B60K 6/48 477/5 |
| 2012/0115676 A1* | 5/2012 | Schiele | B60W 10/06 477/5 |
| 2013/0345019 A1* | 12/2013 | Kaltenbach | B60W 20/40 477/5 |
| 2016/0052381 A1* | 2/2016 | Kaltenbach | B60K 6/38 180/65.23 |

FOREIGN PATENT DOCUMENTS

| | | |
|---|---|---|
| DE | 10 2012 217 249 A1 | 3/2014 |
| DE | 10 2012 224 211 A1 | 6/2014 |

* cited by examiner

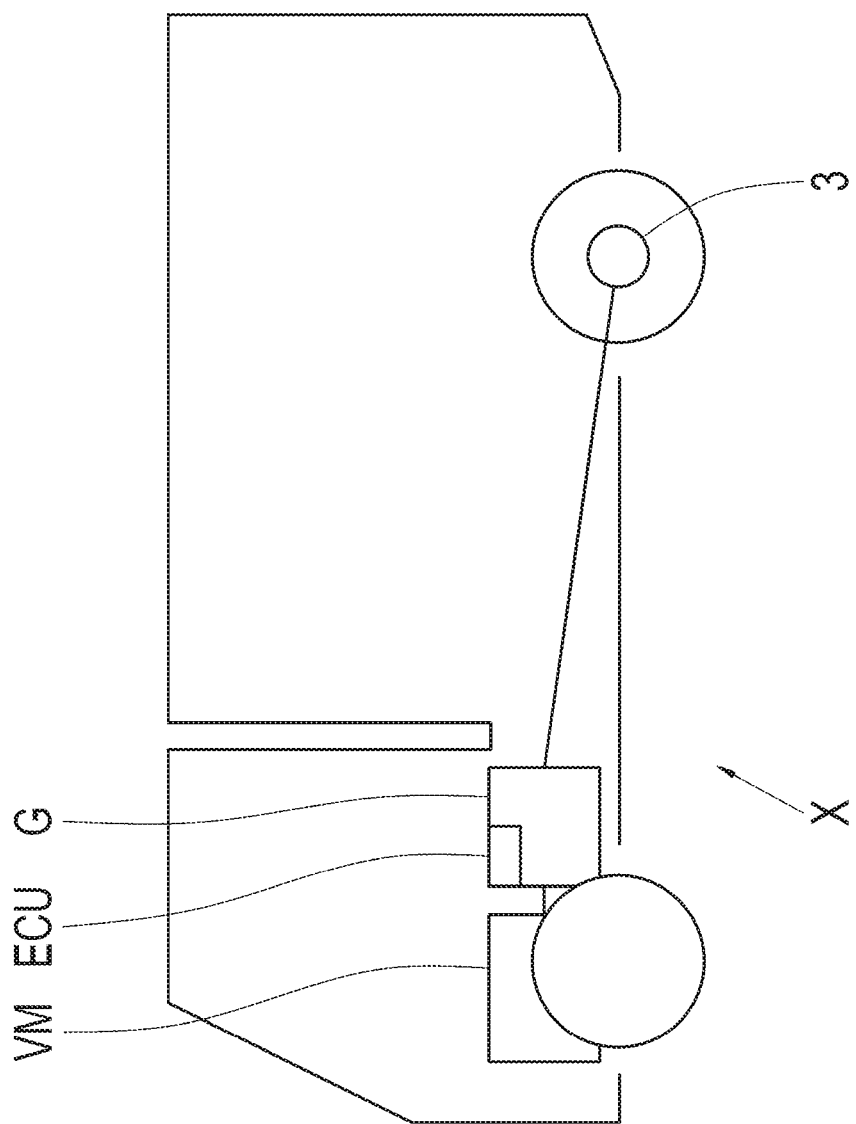

CONTROL METHOD FOR A VEHICLE HYBRID DRIVETRAIN

This application claims priority from German patent application Ser. No. 10 2019 203 225.7 filed Mar. 11, 2019.

FIELD OF THE INVENTION

The invention concerns a method for operating a hybrid drive train of a motor vehicle. The invention also concerns an electronic control unit which is designed to carry out such a method, and to a motor vehicle with such a control unit.

BACKGROUND OF THE INVENTION

DE 10 2012 217 249 A1 describes and a control unit for operating a hybrid vehicle. The hybrid vehicle has an internal combustion engine, an electric machine and a separating clutch which is positioned between the combustion engine and the electric motor, as well as a transmission installed between the electric machine and the output. It is calculated herein, during a driving situation with an engaged gear and a request for shifting a gear, which rotational speed difference will be achieved at the separation clutch by engaging the gear. If the calculated rotational speed difference is larger than a limit value, the combustion engine is started. By starting the combustion engine, the rotational speed at the input side of the separation clutch is increased so that the created rotational speed difference is reduced when the gear is engaged. The separation clutch is hereby disengaged. This method is used to protect the separation clutch from reaching a supercritical rotational speed difference.

SUMMARY OF THE INVENTION

It is an object of the invention to develop the method described at the outset for a purely electric driving operation and with a gear engaged in the transmission.

The objective is reached through the characteristics of the independent claim(s). Advantageous embodiments result from the dependent claims, the description, as well as the drawings.

To achieve the objective, a method is proposed for operating a hybrid drive train of a motor vehicle. The hybrid drive train has a combustion engine, a transmission with an input shaft and an output shaft, an electric machine, as well as a separation clutch. The electric machine is in operating connection with a shaft of the transmission. For this purpose, a rotor of the electric machine can be directly connected to this transmission shaft. Alternatively, the rotor can be connected with the transmission shaft via a transmission gear, so that a constant transmission gear ratio exists between the rotor and the transmission shaft. The transmission shaft is preferably formed by the input shaft of the transmission. The transmission has a gear set which, together with shifting elements, is set up to provide different transmission ratios between the input shaft and the output shaft. The separation clutch is positioned between the combustion engine and the electric machine. When the separation clutch is disengaged, at that time, apart from a drag torque of the separation clutch, no torque is transferred between the combustion engine and the electric machine. The separation clutch is designed as a friction clutch.

According to the invention, it is provided that in a purely electrical driving mode in which the clutch is disengaged and when the gear is engaged in the transmission and when a differential speed of the clutch is expected to be reached or exceeded, is greater than or equal to a limit value or when the electric machine is expects, reaches or exceeds a limit speed the separation clutch is engaged.

This is because in purely electric driving mode, the differential speed of the disengaged clutch can inadvertently reach high values, for example in overrun mode when the motor vehicle is driving downhill. If the electrical machine cannot absorb enough power during regenerative operation, the differential speed of the clutch can continue to increase. By engaging the separation clutch, the combustion engine is connected with the drive train so that the drag torque of the combustion engine decelerates the drive train. This reduces the rotational speed difference at the separation clutch. In addition, the rotational speed limit of the separation clutch in the engaged condition is larger than it is in the disengaged condition, so that the separation clutch is at least protected from mechanical damages.

The method according to the invention serves also for protecting the rotor of the electric machine. By engaging the separation clutch, the combustion engine is connected to the drive train, so that the drag torque of the combustion engine decelerates the drive train. This deceleration can prevent the rotor from rotating at impermissibly high rotational speeds, at which, for instance, the permanent magnets are no longer securely held in the rotor or the maximum permissible peripheral speed at the air gap is exceeded.

The method according to the invention also serves to ensure transmission functionality. Because with increasing rotational speed of the electric machine, the mass moment of inertia of the rotor also increases. If the transmission has synchronized or unsynchronized claw couplings for shifting the gears, the mass moment of inertia counteracts the disengagement of the claw coupling, so that for instance gear disengagement is prevented or at least made more difficult. By engaging the separation clutch, the combustion engine is coupled to the drive train so that the drag torque of the combustion engine decelerates the drive train. This deceleration counteracts the mass inertia torque of the rotor, so that disengagement of the claw coupling is made easier. Such behavior is particularly advantageous when the motor vehicle is accelerating strongly. "Acceleration" means both positive and negative acceleration, i.e., increasing and decreasing vehicle speed.

Depending on the design of the drive train, one scenarios described above can be achieved earlier than the two other scenarios. For instance, the maximum permissible rotational speed difference of the separation clutch can be reached before or after the maximum permissible rotational speed of the rotor is reached. The advantages of the method according to the invention thus depend on the specific configuration of the drive train.

After disconnection, the separation clutch preferably remains closed at least until the differential speed at the separation clutch reaches or falls below a second limit value or until a speed of the electrical machine reaches or falls below a further limit value. Alternatively or as an addition here, a timing gradient of the rotational speed difference at the separation clutch or a timing gradient of the rotational speed of the electric machine can be used as the condition to keep the separation clutch engaged. These parameters are suitable indicators to recognize that the critical situation for the separation clutch, electric machine and/or the transmission functionality has been overcome. Thereafter and preferably, the separation clutch is again disengaged to avoid an unnecessary deceleration of the drive train.

After disengagement, the separation clutch preferably remains closed at least until a deceleration request by a driver of the vehicle has been recognized. Such a deceleration request can, for instance, be recognized by activating a brake pedal or by other driver side activation of a brake device of the motor vehicle. Through such activity, the performance of the motor vehicle is more comprehensible of the driver.

The combustion engine is preferably operated without firing during the engagement of the separation clutch and preferably remains in that condition for a defined time interval. Alternatively, a start of the combustion engine can be initiated when the separation clutch is engaged. The decision, whether the combustion engine is operated or not fired preferably depends on position information of the motor vehicle, for instance GPS information. This can ensure that the motor vehicle can be operated in regions in which a combustion engine operation is not allowed.

The method according to the invention is preferably executed on the control side by an electronic control unit of the motor vehicle. The electronic control unit can be for instance assigned to a transmission. Alternatively, the electronic control unit can coordinate the functionality of the entire drive train.

The electronic control unit can be part of a motor vehicle, in particular a heavy truck. This is because the problem on which the invention is based can occur in particular with motor vehicle with a high mass.

BRIEF DESCRIPTION OF THE DRAWINGS

An embodiment of the invention is described in detail in the following, based on the attached drawings. These show.

DETAILED DESCRIPTION OF THE PREFERRED EMBODIMENTS

Figure 1:
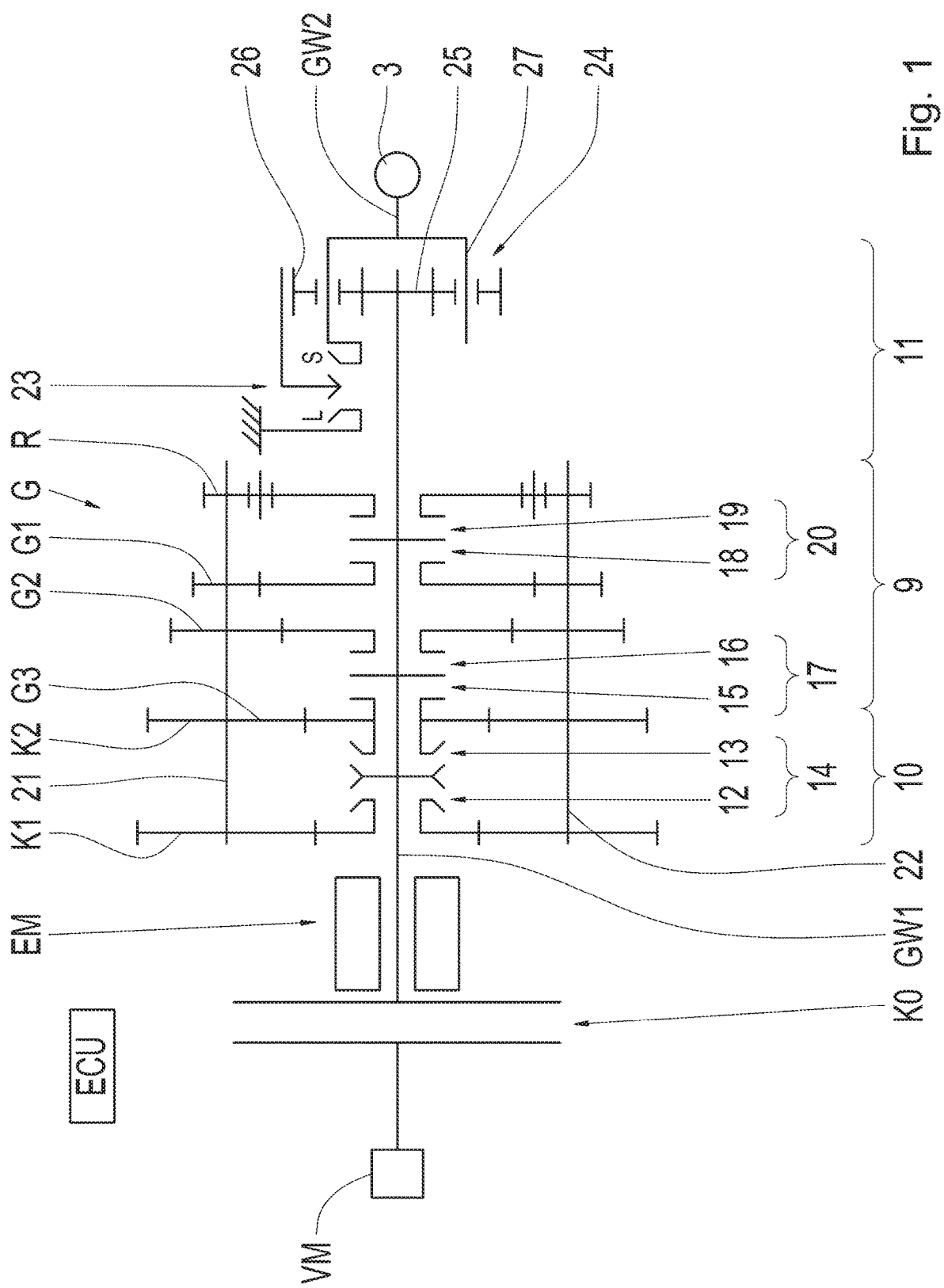
FIG. 1 a schematic representation of a drive train for a motor vehicle.

FIG. 1 shows a schematic of a drive train of a motor vehicle X with a combustion engine VM, with a transmission G, and an output 3.

In the exemplary embodiment shown, the drive train comprises the internal combustion engine VM and an electrical machine EM. The combustion engine VM can be connected via a separation clutch KO, which also serves as starting clutch, to an input shaft GW of the transmission G. The electric machine EM is permanently connected to the input shaft GW of the transmission G. The output 3 is connected to an output shaft GW2 of the transmission G. An electronic control unit ECU is provided for the control of functions of the drive train.

The transmission G is constructed as a group transmission and comprises, in the exemplary embodiment shown, a main transmission 9, a split group 10, which is arranged with regard to drive technology, upstream of the main transmission 9, and a range group 11 downstream of the main transmission 9. The main transmission 9 is also referred to as a main group. The main transmission 9 of the transmission G is designed as direct drive gearbox in countershaft construction and has two countershafts 21, 22.

The main transmission 9 is designed in the exemplary embodiment shown with three gear ratio steps G1, G2, G3 for forward drive and one gear ratio step R for reverse drive. Idle gear wheels of the gear ratio steps G1, G2 and R are each rotatably mounted on the main shaft and can be shifted via associated shift elements 15, 16, 18, and 19 designed as claw clutches. The assigned fixed gear wheels are arranged in a rotationally fixed manner on the countershafts 21, 22. The two shift elements 15, 16 and the two shift elements 18, 19 each form a shift packet 17 and 20, respectively. The main transmission 9 can be shifted unsynchronized.

In the exemplary embodiment shown, the split group 10 of the transmission G has a two gear ratio step design and is likewise designed in a countershaft design, the two gear ratio steps K1 and K2 of the split group 10 form two shiftable input constants of the main transmission 9. The two gear ratio steps K1, K2 have a smaller gear ratio difference.

The idle gear wheel of the first gear ratio step K1 is rotatably mounted on the input shaft GW1. The idle gear wheel of the second transmission gear ratio step K2 is rotatably mounted on the main shaft. The fixed gear wheels of both transmission gear ratio steps K1, K2 of the split group 10 are each arranged in a rotationally fixed manner with the input side of the countershafts 21, 22 of the main transmission 9. Synchronized shift elements 12, 13, so-called synchronous shift elements, of the split group 10 are combined as a common shift packet 14.

The optional range group 11 of the transmission 2, which is arranged downstream of the main transmission 9, is also designed in two stages, but as a planetary transmission 24. The sun gear 25 is connected in a rotationally fixed manner to the output side of the main shaft of the main transmission 9. The planetary carrier 27 is rotationally fixed to the output shaft GW2 of the transmission G. The ring gear 26 is connected to a shift packet 23 with two synchronized shift clutches, through which the range group 11 is alternately shiftable by connecting the ring gear 26 a fixed housing part in a slow speed drive step L and by the connecting the ring gear 26 with the planetary carrier 27 in a high speed drive step S. The range group 11 can be shifted synchronously.

Figure 2:
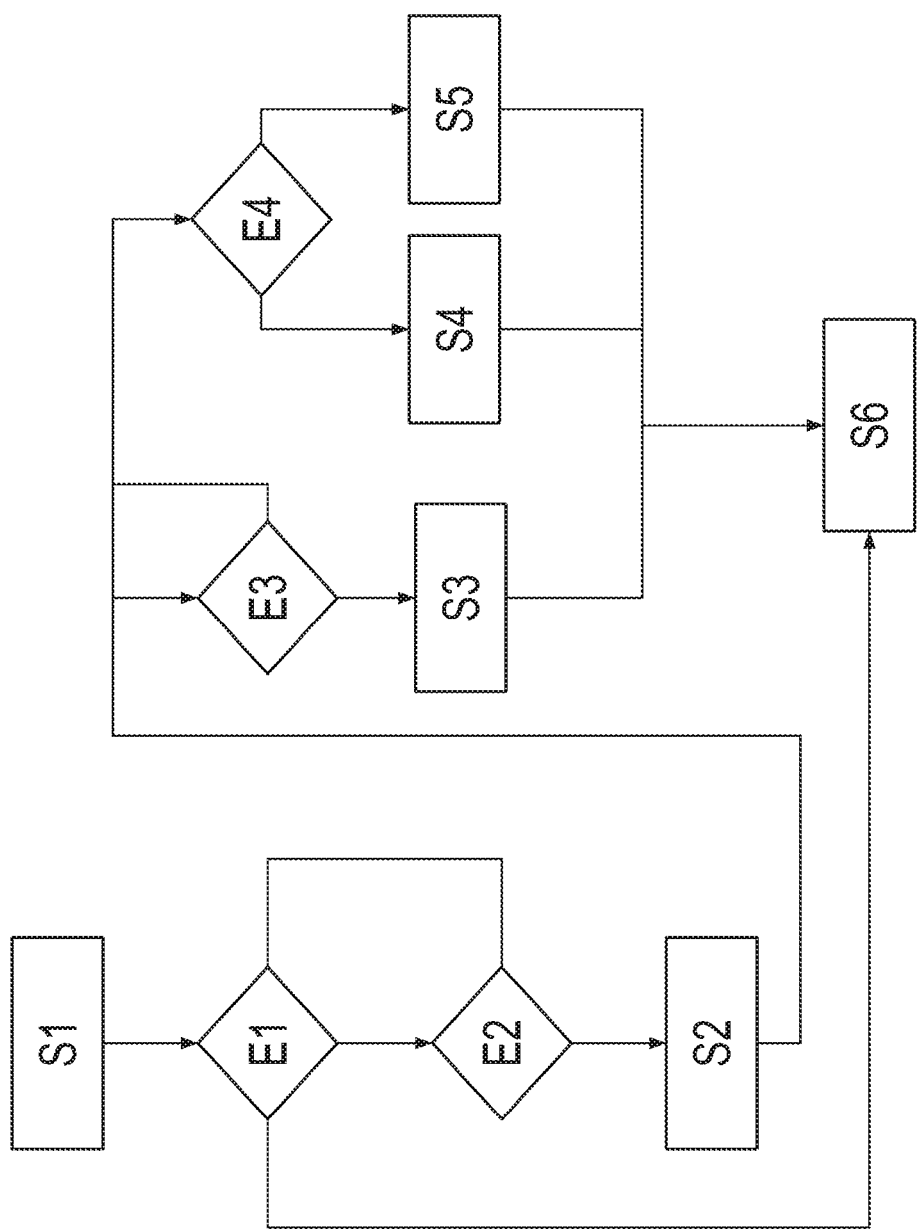
FIG. 2 an exemplary flowchart for a method for operating the drive train; as well as FIG. 3 a schematic representation of a motor vehicle

FIG. 2 shows an exemplary flowchart for a method of operating the drive train shown in FIG. 1, which is carried out by the electronic control unit ECU. In step S1, the motor vehicle X is in operation. In the determination E1, it is checked whether the motor vehicle X is operating in a purely electric drive mode in which the separation clutch KO is disengaged, and whether a gear step is engaged in the transmission G. If one of these conditions does not apply, no further steps are initiated; as shown with step S6. However, If one of these conditions applies, it is checked in determination E2 whether a rotational speed difference at the separation clutch KO is larger than or equal to a limit value or if it is foreseeable that this limit value will be reached, or whether a rotational speed limit of the electric machine EM has been reached or exceeded, or it is foreseeable that this rotational speed limit will be reached.

If at least one of these conditions applies, a command is issued in step S2 to engage the separation clutch KO. If none of these conditions apply, the determination E1 checks again whether the entry conditions for determination E2 are present.

Following the step S2, it is checked in determination E3 whether the separating clutch KO is to be disengaged again. It is checked whether the rotational speed difference at the separating clutch KO reaches or falls below a second limit value, or whether the rotational speed of the electrical machine EM reaches or falls below a further limit value.

In addition or as an alternative to this, determination E3 can check, whether
a time gradient of the differential speed at the separating clutch KO reaches or exceeds a limit value, or
whether a time gradient of the rotational speed of the electric machine EM has reached or exceeds a limit value.

In addition or alternatively, it can be checked in determination E3 whether a driver-side deceleration request which is recognized, for example, by actuating a brake pedal of motor vehicle X.

If at least one of these conditions applies, in determination E3 it is decided that the separation clutch KO should be disengaged again. The corresponding command is issued in step 33, whereupon the functional sequence is terminated, shown as step S6.

Subsequent to step S2, it is checked in determination E4 whether a start of the combustion engine VM should be initiated when the separation clutch KO is engaged. In determination E4, the operating strategy of the motor vehicle X is take into account, which is also carried out, for example, by the electronic control unit ECU. In determination E4, the GPS position of the motor vehicle X can be taken into account. Depending on the determination E4, a command to start the combustion engine VM is issued in step S4, or in step S5 a command is issued for an unfired operation of the combustion engine VM. Thereafter, the function sequence is terminated, shown as step S6.

FIG. 3 schematically shows the motor vehicle X with a drive train in accordance with FIG. 1, whereby the motor vehicle X is represented, for example as a truck. The motor vehicle X has a combustion engine VM and the transmission G, the electronic control unit ECU being structurally assigned to the transmission G. The electric machine EM, as well as the separation clutch KO are arranged in the transmission G.

REFERENCE CHARACTERS

X Motor Vehicle
G Transmission
3 Output
VM Combustion Engine
KO Separation Clutch
GW1 Input Shaft
EM Electric Machine
GW2 Output Shaft
9 Main Transmission
10 Split group
11 Range group
12 Synchronization Element
13 Synchronization Element
14 Shift Cluster
15 Shift Element
16 Shift Element
17 Shift Cluster
18 Shift Element
19 Shift Element
20 Shift Cluster
21 Countershaft
22 Countershaft
23 Shift Cluster
24 Planetary Transmission
25 Sun Gear
26 Ring Gear
27 Planetary Carrier
K1, K2 Transmission Gear Steps
G1, G2, G3 Transmission Gear Steps
R Transmission Step
L Low Speed Drive Step
S High-Speed Drive Step
ECU Electronic Control Device
S1-S6 Step
E1-E4 Determination

The invention claimed is:

1. A method for operating a hybrid drive train of a motor vehicle which has a combustion engine, a transmission, an electric machine which is operationally connected with a shaft of the transmission, and a separation clutch arranged between the combustion engine and the electric machine, the method comprising:
engaging the separation clutch
during a pure electric drive operation, in which the separation clutch is disengaged,
when a gear is engaged in the transmission, and
when at least one of
a rotational speed difference of the separation clutch is expected, reached, or exceeded that is larger than or equal to a first limit value, and
a rotational speed limit of the electric machine is expected, reached, or exceeded.

2. The method according to claim 1, further comprising maintaining engagement of the separation clutch as long as at least one of:
the rotational speed difference at the separation clutch has reached or falls below a second limit value, and
a rotational speed of the electric machine reaches or falls below an additional limit value, and
at this time the separation clutch is again disengaged.

3. The method according to claim 1, further comprising that the separation clutch remains engaged until at least one of
a timing gradient of the rotational speed difference at the separation clutch reaches or exceed a clutch gradient limit value, and
a timing gradient of the rotational speed of the electric machine has reached or exceeded a maching gradient limit value, and
at this time the separation clutch is then again disengaged.

4. The method according to claim 1, further comprising maintaining engagement of the separation clutch as long as a driver deceleration request is recognized, and then disengaging the separation clutch again.

5. The method according to claim 1, further comprising operating the combustion engine unfired during engagement of the separation clutch.

6. The method according to claim 5, further comprising operating the combustion engine unfired for a defined time period after the engagement of the separation clutch.

7. The method according to claim 1, further comprising initiating a start of the combustion engine when the separation clutch is engaged.

8. The method according to claim 1, further comprising, when the separation clutch is engaged, depending on position information of the motor vehicle, either:
initiating a start of the combustion engine, or
operating the combustion engine unfired, during the engagement of the separation clutch and at least for a defined time period after the engagement of the separation clutch.

9. The method according to claim 1, further comprising carrying out the method when at least one of the motor vehicle is operating in an overrun mode, and an acceleration limit value of the motor vehicle is reached or exceeded.

10. The method according to claim 1, wherein the shaft of the transmission, which is operatively connected to the electric machine, is formed by an input shaft of the transmission.

11. An electronic control unit for a motor vehicle which is designed to carry out the method according to claim 1 on a control side.

12. A motor vehicle comprising the electronic control unit according to claim 11.

13. The motor vehicle according to claim 12, wherein the motor vehicle is a heavy truck.

* * * * *